US012329699B2

(12) United States Patent
Liu et al.

(10) Patent No.: US 12,329,699 B2
(45) Date of Patent: Jun. 17, 2025

(54) INTELLIGENT BATHING BED

(71) Applicant: CHINA ACADEMY OF ART, Hangzhou (CN)

(72) Inventors: Zheng Liu, Hangzhou (CN); Yimo Wang, Hangzhou (CN); Jianming Song, Hangzhou (CN)

(73) Assignee: CHINA ACADEMY OF ART, Hangzhou (CN)

( * ) Notice: Subject to any disclaimer, the term of this patent is extended or adjusted under 35 U.S.C. 154(b) by 274 days.

(21) Appl. No.: 17/990,226

(22) Filed: Nov. 18, 2022

(65) Prior Publication Data

US 2023/0157910 A1 May 25, 2023

(30) Foreign Application Priority Data

Nov. 23, 2021 (CN) ........................ 202111397444.X

(51) Int. Cl.
*A61G 7/00* (2006.01)
*A61H 15/00* (2006.01)
*B08B 1/10* (2024.01)

(52) U.S. Cl.
CPC ....... *A61G 7/0005* (2013.01); *A61H 15/0078* (2013.01); *B08B 1/10* (2024.01); *A61H 2015/0014* (2013.01); *A61H 2015/0021* (2013.01); *A61H 2201/0146* (2013.01); *A61H 2201/5043* (2013.01); *A61H 2201/5092* (2013.01); *A61H 2205/108* (2013.01); *A61H 2205/12* (2013.01); *A61H 2230/045* (2013.01)

(58) Field of Classification Search
CPC .................................................... A61G 7/0005
USPC ........................................................... 4/573.1
See application file for complete search history.

(56) References Cited

U.S. PATENT DOCUMENTS 3,701,170 A * 10/1972 Bond ..................... A47K 3/001 5/81.1 R
2014/0310875 A1* 10/2014 Iida ...................... A61G 10/005 5/606
2017/0216116 A1* 8/2017 Lai ......................... A61G 7/015

* cited by examiner

*Primary Examiner* — Lauren A Crane
(74) *Attorney, Agent, or Firm* — MUNCY, GEISSLER, OLDS & LOWE, P.C.

(57) ABSTRACT

An intelligent bathing bed is provided, which includes an underframe and a mattress. The mattress is arranged within the underframe, the mattress includes a fixed mattress and a movable mattress. The fixed mattress and the movable mattress are arranged at intervals in a same plane. The movable mattress is connected with the underframe through a water outlet pipe. The movable mattress includes a roller. A peripheral surface of the roller is provided with a water outlet array and a massaging head array. The water outlet array and the massaging head array are arranged at intervals. The intelligent bathing bed further includes a driving mechanism. The roller is connected with the driving mechanism, and the roller is driven by the driving mechanism to rotate along a central axis. The disclosure has advantages that it is less operation difficulty, can guarantee use safety of the users, and is suitable for the elderly population.

11 Claims, 3 Drawing Sheets

INTELLIGENT BATHING BED

TECHNICAL FIELD

The disclosure belongs to the technical field of intelligent bathing equipment, in particular to an intelligent bathing bed.

BACKGROUND ART

Due to physical characteristics such as difficulty in limb movement and stiffness of limbs, the elderly can't take a bath independently. Especially for patients with cardiovascular and cerebrovascular diseases and vulnerable groups in the elderly, it is prone to causing diseases when taking a bath, because of high-temperature sealed environment, long-time bathing and lack of safety awareness among target groups or for other reasons.

In order to solve above problems, various bathing beds have emerged in the market at present, but most of them have single function, and it is difficult for elderly users to use, and there's no related intelligent product, especially bathing equipment in view of body metrics of patients with cardiovascular and cerebrovascular diseases.

SUMMARY

An object of the present disclosure is to provide an intelligent bathing bed to solve technical problems of low automation and difficulty for elderly users in related art.

In order to achieve the above technical object, technical schemes adopted by the disclosure are as follows.

An intelligent bathing bed includes an underframe and a mattress. The mattress is arranged within the underframe, the mattress includes a fixed mattress and a movable mattress. The fixed mattress and the movable mattress are arranged at intervals in a same plane. The movable mattress is connected with the underframe through a water outlet pipe. The movable mattress includes a roller. A peripheral surface of the roller is provided with a water outlet array and a massaging head array. The water outlet array and the massaging head array are arranged at intervals. The intelligent bathing bed further includes a driving mechanism. The roller is connected with the driving mechanism, and the roller is driven by the driving mechanism to rotate along a central axis.

Preferably, the underframe includes a water receiving basin, a water outlet and a movable support frame. The water outlet is arranged on the water receiving basin, the movable support frame is connected with the water receiving basin, and the movable support frame is provided with a universal wheel.

Preferably, the water outlet array includes a spray head and an atomizing spray bar. The spray head is arranged on the peripheral surface of the roller, one end of the atomizing spray bar is connected with the spray head, and the other end of the atomizing spray bar is connected with the water outlet pipe.

Preferably, the intelligent bathing bed further includes a scrubbing device and a scrubbing support frame. A height of the scrubbing device is provided to be higher than that of the mattress, a bottom of the scrubbing device is provided with scrubbing balls, one end of the scrubbing support frame is connected with a side wall of the underframe, and the other end of the scrubbing support frame is connected with the scrubbing device.

Preferably, the intelligent bathing bed further includes a bed shed. The bed shed is connected with the underframe, and the bed shed includes a bed shed support frame and a waterproof layer. The waterproof layer is connected with the bed shed support frame, and the bed shed support frame is arranged at a top of the underframe.

Preferably, the intelligent bathing bed further includes a drying device. The drying device is arranged on the side wall of the underframe and includes a blower of which a temperature and a wind speed can be adjustable.

Preferably, the intelligent bathing bed further includes a monitoring device. The monitoring device includes an infrared sensor and a cardiac electric monitoring armlet.

Preferably, the intelligent bathing bed further includes a fixed mattress support and a water inlet device. The fixed mattress support is connected with the underframe and the fixed mattress respectively, and the water inlet device is connected with the water outlet pipe.

Preferably, the water inlet device includes a water pump, a water tank and a water inlet pipe group. The water pump, the water tank and the water inlet pipe group are all arranged on the underframe, the water pump is connected with the water tank through a first solenoid, and the water tank is connected with the water inlet pipe group.

Preferably, the intelligent bathing bed further includes a display screen and an image processor. The display screen is connected with the cardiac electric monitoring armlet, and the image processor is connected with the infrared sensor.

The disclosure has advantages as follows.

1. In this disclosure, the underframe and the mattress are included, the mattress includes the fixed mattress and the movable mattress, the movable mattress includes a roller, the outer peripheral surface of the roller is provided with the water outlet array and the massaging head array; the driving mechanism is further included, the roller is driven by the driving mechanism to rotate along the central axis. The water outlet array and the massaging head array on the orderly rotating roller can serve to massage waist, thighs and soles of the feet of a user, so as to promote blood circulation of the user during bathing. In this way, incidence of diseases of the elderly population can be reduced and automatic water spraying and foaming can be realized, without manually controlling of sequences of water outlet, rubbing and the like; and bathing time can be automatically controlled with high automation and less operation difficulty, which can guarantee use safety of the users, and is suitable for the elderly population.

2. The bottom of the scrubbing device according to this disclosure is provided with scrubbing balls, and the scrubbing device is moved on a surface of a user's body in sequence during bathing, which increases adaptation time of the body and reduces stimulation generated during bathing. The drying device serves to dry the surface of the user's body after bathing, and the bathing bed device can be dried after the bathing bed is used, and the temperature and wind speed during drying can be adjusted.

3. The monitoring device in this disclosure includes an infrared sensor and an cardiac electric monitoring armlet. The infrared sensor can recognize a posture of the user's body, and the driving mechanism drives the water outlet array of the movable mattress and the rubbing device to take a bath firstly for limbs and then trunk, so as to reduce sudden expansion of skin vessels of the head and the whole body caused by warm water in a contraction state of the skin vessels of the human body, resulting in acute ischemia of important organs such as the heart and brain, dizziness and chest tightness, thus causing cardiovascular and cerebrovascular diseases. The cardiac electric monitoring armlet can monitor the user's heart rate, blood pressure and electrocardiogram. In case of abnormal heart rate, abnormal breathing and abnormal blood pressure, the bath bed can be stopped operating immediately, and an alarm can be given through the display screen.

BRIEF DESCRIPTION OF THE DRAWINGS

In order to explain technical schemes in the embodiments of the present disclosure more clearly, the drawings required in the description of the embodiments or the prior art will be briefly introduced below; obviously, the drawings in the following description are only some embodiments of the present disclosure, and other drawings can be obtained according to these drawings by those of ordinary skill in the art without paying creative labor.

Figure 1:
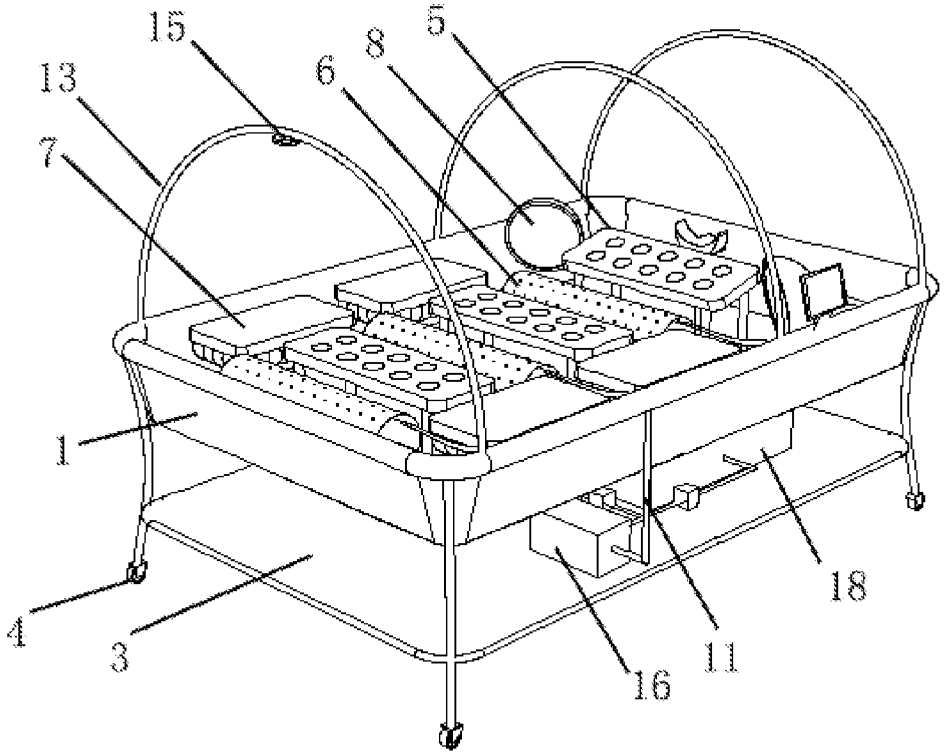
FIG. 1 is a schematic diagram of an overall structure of an intelligent bathing bed.

Reference numbers of main components are as follows:

1. Water Receiving Basin; 2. Water Outlet; 3. Movable Support Frame; 4. Universal Wheel; 5. Fixed Mattress; 6. Roller; 7. Rubbing Device; 8. Drying Device; 9. Water Outlet Array; 10. Massaging Head Array; 11. Outlet Pipe; 12. Scrubbing Support Frame; 13. Bed Shed Support Frame; 14. Water Inlet Pipe Group; 15. Infrared Sensor; 16. Water Pump; 17. Body Wash Bottle; 18. Water Tank; 19. Display Screen.

DETAILED DESCRIPTION

In order to make the purposes, technical schemes and advantages of embodiments of this disclosure more clear, the technical schemes in the embodiments of this disclosure will be described clearly and completely with reference to the drawings in the embodiments of this disclosure; and it is obvious that the described embodiments are part of the embodiments of this disclosure, but not all of them. Generally, components of the embodiments of the present disclosure described and illustrated in the drawings herein may be arranged and designed in various different configurations.

Therefore, the following detailed description of the embodiments of the disclosure provided in the drawings is not intended to limit the claimed scope of the application, but only shows selected embodiments of the disclosure. On a basis of the embodiments in this disclosure, all other embodiments obtained by the ordinary skilled in the art without any creative effort are within the protection scope of this disclosure.

Figure 2:
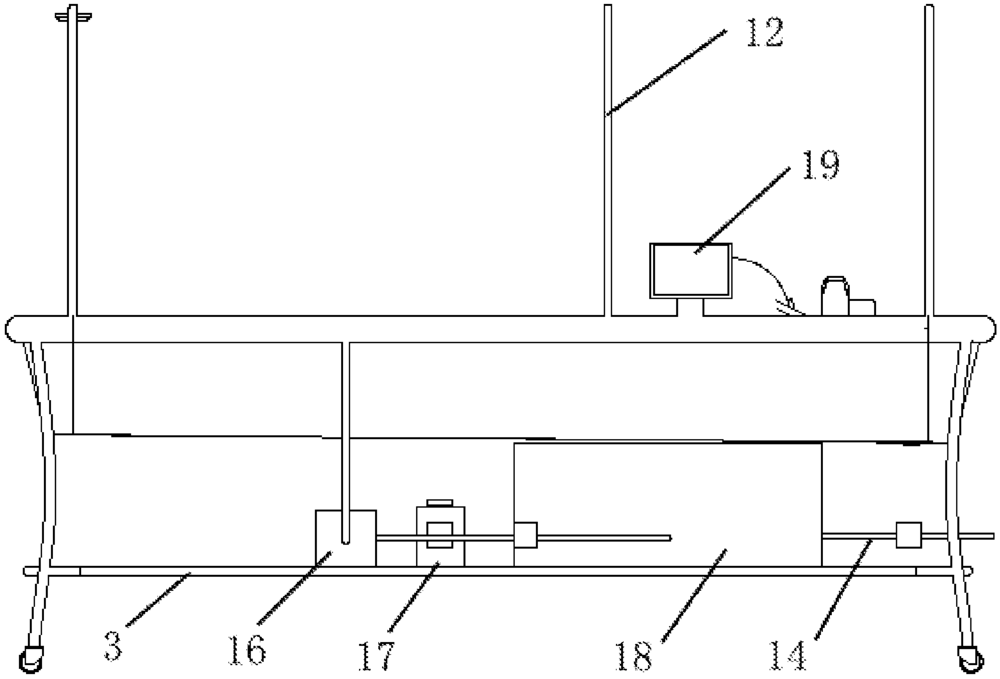
FIG. 2 is a schematic side view of an intelligent bathing bed according to the disclosure.
Figure 3:
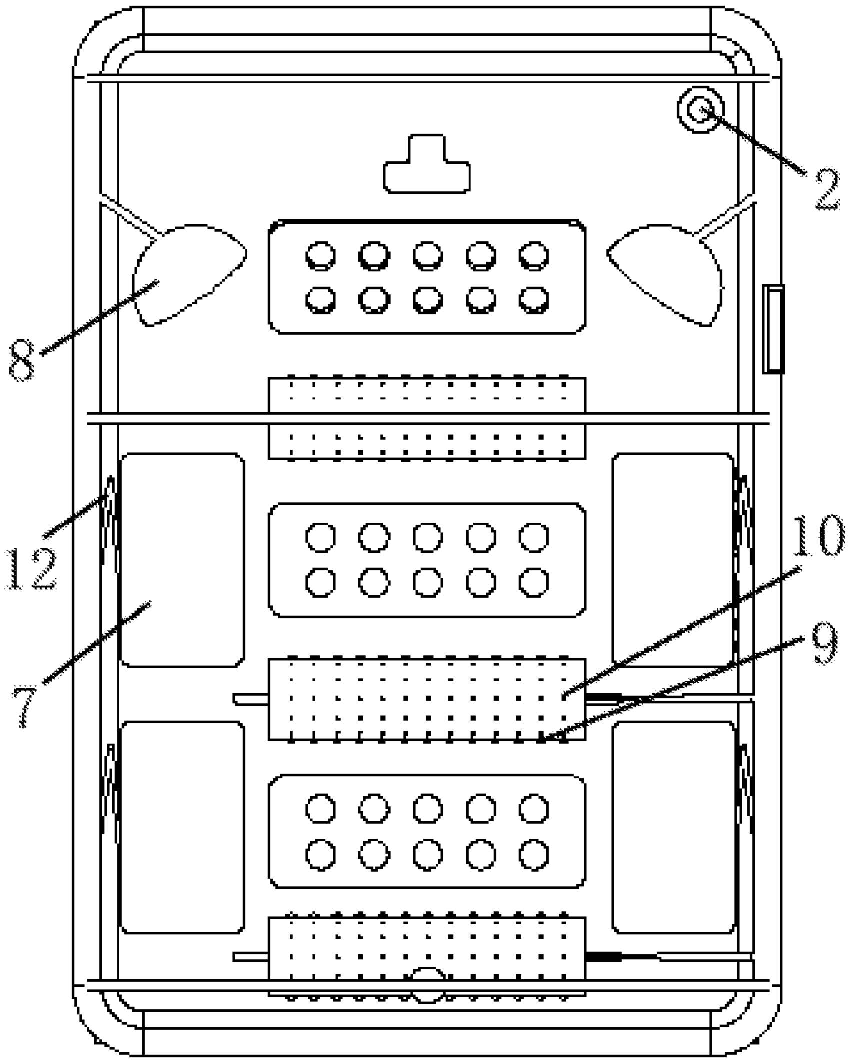
FIG. 3 is a schematic plan view of an intelligent bathing bed according to the disclosure.

As shown in FIG. 1 to FIG. 3, an intelligent bathing bed is included in this disclosure, which includes an underframe and a mattress. The mattress is arranged within the underframe, the mattress includes a fixed mattress 5 and a movable mattress. The fixed mattress 5 and the movable mattress are arranged at intervals in a same plane. The movable mattress is connected with the underframe through a water outlet pipe 11. The movable mattress includes a roller 6. A peripheral surface of the roller 6 is provided with a water outlet array 9 and a massaging head array 10. The water outlet array 9 and the massaging head array 10 are arranged at intervals. The intelligent bathing bed further includes a driving mechanism. The roller 6 is connected with the driving mechanism, and the roller 6 is driven by the driving mechanism to rotate along a central axis.

The water outlet array 9 includes a spray head and an atomizing spray bar. The spray head is arranged on the peripheral surface of the roller 6, one end of the atomizing spray bar is connected with the spray head, and the other end of the atomizing spray bar is connected with the water outlet pipe 11. Specifically, the water outlet array 9 and the massaging head array 10 are arranged at intervals on the peripheral surface of the roller 6. In this embodiment, the massaging head array 10 and the roller 6 can be provided in an integrated structure, and the massaging head array 10 can be detachably connected with the roller 6.

The underframe includes a water receiving basin 1, a water outlet 2 and a movable support frame 3. The water outlet 2 is arranged on the water receiving basin 1, the movable support frame 3 is connected with the water receiving basin 1, and the movable support frame 3 is provided with a universal wheel 4. In this embodiment, the water receiving basin 1 is located below the mattress, and a size of the water receiving basin 1 is the same as that of a bed frame of the mattress, and a plane where a side of a bottom surface of the water receiving basin 1 proximate to the water outlet 2 is lower, so that wastewater can flow out toward the water outlet 2. When a user lies flat on the mattress and takes a bath, the wastewater is collected with the water receiving basin 1, and then is discharged centrally through the water outlet 2 arranged on the water receiving basin 1.

Specifically, the fixed mattress 5 is located on the head, shoulders, hips and legs of the user. In this embodiment, the movable mattress is provided with three rollers 6, which are located on the waist, thighs and soles of the user respectively. The three rollers 6 are all connected with the driving mechanism and driven by the driving mechanism to rotate along a central axis. The movable mattress sprays water through the water outlet array 9, and the movable mattress serves to massage the user through the massaging head array 10, which can massage the waist, thighs and soles of the feet of the user, and promote the blood circulation of the user during bathing, thereby reducing incidence of diseases of the elderly. In this embodiment, angles of one or more of fixed mattresses located on the head of the user can be adjusted and heights thereof can also be adjusted to an angle or height suitable for a partially reclined posture of the user or other postures, so it is not necessary that all of the fixed mattresses are located in a same plane.

The intelligent bathing bed further includes a scrubbing device 7 and a scrubbing support frame 12. An height of the scrubbing device 7 is provided to be higher than that of the mattress, a bottom of the scrubbing device 7 is provided with scrubbing balls, one end of the scrubbing support frame 12 is connected with a side wall of the underframe, and the other end of the scrubbing support frame 12 is connected with the scrubbing device 7. In this embodiment, the scrubbing device 7 can be adjusted up and down according to needs of users. The scrubbing devices 7 in this embodiment are distributed on both sides of the fixed mattress 5 and the movable mattress.

Specifically, one end of the scrubbing support frame 12 is connected with a side wall of the water receiving basin 1, and the other end of the scrubbing support frame 12 is connected with the scrubbing device 7, and the scrubbing device 7 is configured for cleaning users. In this embodiment, side walls of the water receiving basin 1 at both sides thereof are provided with the scrubbing support 12, and the scrubbing device 7 is loaded on the scrubbing supports 12 on both sides of the water receiving basin 1. The scrubbing support 12 is respectively connected with the scrubbing device 7 and the water receiving basin 1, and the scrubbing device 7 is also connected with the driving mechanism, which is controlled by the passive infrared sensor 15 and the scrubbing device 7 is driven by the driving mechanism to move back and forth along an axial direction of a roller shaft.

The intelligent bathing bed further includes a bed shed. The bed shed is connected with the underframe, and the bed shed includes a bed shed support frame 13 and a waterproof layer. The waterproof layer is connected with the bed shed support frame 13, and the bed shed support frame 13 is arranged at a top of the underframe.

Specifically, the bed shed support frame 13 is respectively connected with the water receiving basin 1 and the waterproof layer, and numbers of the bed shed support frame 13 and the waterproof layer are multiple. In this embodiment, two bed shed supports 13 are fixedly connected at a head and a tail of the mattress, one of the two bed shed support 13 is detachably connected at a middle of the mattress, and the bed shed support 13 detachably connected at the middle of the mattress is configured to facilitate users to enter the bathing bed. The head and the tail of the mattress are provided with the waterproof layer, which can be made of cloth with waterproof function to protect users' privacy, keep warm and prevent splashing of bath water during bathing.

The intelligent bathing bed further includes a drying device 8. The drying device 8 is arranged on the side wall of the underframe and includes a blower of which a temperature and a wind speed can be adjustable. Specifically, the drying device 8 is arranged on the side wall of the water receiving basin 1, and the drying device 8 is configured for drying the body surface of the user after bathing.

The intelligent bathing bed further includes a monitoring device. The monitoring device includes an infrared sensor 15 and a cardiac electric monitoring armlet. The intelligent bathing bed further includes a display screen 19 and an image processor. The display screen 19 is connected with the cardiac electric monitoring armlet, and the image processor is connected with the infrared sensor 15.

In this embodiment, the infrared sensor 15 is arranged on the bed shed, and the infrared sensor 15 is a passive infrared sensor 15. The passive infrared sensor 15 is arranged on the bed shed support frame 13, and the passive infrared sensor 15 is configured to identify the user's body posture. The passive infrared sensor 15 does not need an additional infrared radiation source, and infrared radiation from a moving target is directly detected by the sensor for the recognition of the body posture.

The cardiac electric monitoring armlet is configured to monitor the user's heart rate, blood pressure and electrocardiogram, and the display screen 19 is configured to display monitoring results and alarm from the cardiac electric monitoring armlet. The user wears the cardiac electric monitoring armlet 2 to 3 cm above cubital fossa during bathing for monitoring the user's heart rate, blood pressure and electrocardiogram. In this embodiment, a human motion model is constructed based on an image processing algorithm by the image processor and the processing software build.

In this embodiment, when the user lies on the bathing bed, the passive infrared sensor 15 determines whether it is a front of the human body based on the human motion model. If the determination result indicates it is the front of the human body, the water outlet array 9 is controlled to discharge water through the water outlet pipe, and the driving mechanism controls the roller 6 not to rotate. The passive infrared sensor 15 is configured to detect front limbs and torso of the human body based on the human motion model. The driving mechanism controls the scrubbing device 7 to be positioned on the limbs for scrubbing, and then the driving mechanism controls the scrubbing device 7 to be positioned on the torso for scrubbing. After preset scrubbing time is reached, the scrubbing device 7 stops automatically.

At the same time, the display screen 19 gives a voice prompt to remind the user to turn over and scrub back of the human body. The passive infrared sensor 15 determines whether it is the back of the human body based on the human motion model. If the determination result indicates it is the back of the human body, the water outlet array 9 is controlled to discharge water through the water outlet pipe, and the driving mechanism controls the roller 6 not to rotate. The passive infrared sensor 15 is configured to detect back limbs and torso of the human body based on the human motion model. The driving mechanism controls the scrubbing device 7 to be positioned on the limbs for scrubbing, and then the driving mechanism controls the scrubbing device 7 to be positioned on the torso for scrubbing. After preset scrubbing time is reached, the scrubbing device 7 stops automatically. The limbs and then the trunk are scrubbed, which facilitates reducing of stress response of users and probability of acute ischemia of important organs such as the heart and brain, dizziness and chest tightness caused by sudden expansion of skin vessels in the whole body.

At the same time, the display screen 19 gives a voice prompt to remind the user to turn over and wash again, and the water outlet array 9 is controlled to discharge water through the water outlet pipe. After preset washing time is reached, the roller 6 rotates through the driving mechanism and massages the user through the massaging head array 10.

If symptoms such as abnormal heart rate, shortness of breath or elevated blood pressure are detected by the cardiac electric monitoring armlet during bathing, and abnormality is detected by the cardiac electric monitoring armlet, the whole bathing bed may immediately stop running, and the display screen 19 may give an alarm at the same time.

The intelligent bathing bed further includes a fixed mattress 5 support and a water inlet device. The fixed mattress 5 support is connected with the underframe and the fixed mattress 5 respectively, and the water inlet device is connected with the water outlet pipe 11. The water inlet device includes a water pump 16, a water tank 18 and a water inlet pipe group 14. The water pump 16, the water tank 18 and the water inlet pipe group 14 are all arranged on the underframe, the water pump 16 is connected with the water tank 18 through a first solenoid, and the water tank 18 is connected with the water inlet pipe group 14.

Specifically, the fixed mattress 5 support is connected with the bottom surface of the water receiving basin 1, and the water inlet device is arranged on the movable support frame 3. The water inlet device further includes a body wash bottle 17 which is connected with the water pump 16 through a second solenoid. The water inlet pipe group 14 includes a hot water inlet pipe and a cold water inlet pipe, both of which are connected to the water tank 18.

It should be noted that:

Reference to "one embodiment" or "an embodiment" in the specification means that a specific feature, structure or characteristic described in connection with embodiments is included in at least one embodiment of the present disclosure. Therefore, the phrases "one embodiment" or "an embodiment" appearing in various places throughout the specification do not necessarily refer to the same embodiment.

Although the preferred embodiments of the present disclosure have been described, additional changes and modifications can be made to these embodiments by those skilled in the art once basic inventive concepts are known. Therefore, the appended claims are intended to be interpreted as including the preferred embodiments and all changes and modifications falling within the scope of the present disclosure.

In addition, it should be noted that the specific embodiments described in this specification may have different shapes, names or the like of parts and components. Equivalent or simple changes made in accordance with the configurations, features and principles described in the inventive concept are included in the scope of protection of the inventive disclosure. Various modifications, supplements or similar replacements can be made to the described specific embodiments by those skilled in the art to which the present disclosure pertains, which fall within the protection scope of the present disclosure without departing from the structure of the present disclosure or beyond the scope defined by the claims.

The invention claimed is:

1. An intelligent bathing bed, comprising an underframe and a mattress, wherein the mattress is arranged within the underframe, the mattress comprises a fixed mattress and a movable mattress, there are multiple fixed mattresses and multiple movable mattresses, and the multiple fixed mattresses and the multiple movable mattresses are arranged at intervals in a same plane so that the multiple fixed mattresses corresponded to a head, shoulders, hips and legs of a user respectively, and the multiple movable mattresses corresponded to a waist, thighs and soles of the user respectively, wherein each movable mattress is connected with the underframe through a water outlet pipe, each movable mattress comprises a roller, a peripheral surface of the roller is provided with a water outlet array and a massaging head array, the water outlet array and the massaging head array are arranged at intervals; wherein the intelligent bathing bed further comprises a driving mechanism, the roller is connected with the driving mechanism, and the roller is driven by the driving mechanism to rotate along a central axis, thereby the water outlet array and the massaging head array on the roller can serve to massage the waist, the thighs and the soles of the user;

wherein angles or heights of one or more of fixed mattresses located on or near a head of the user can be adjusted.

2. The intelligent bathing bed according to claim 1, wherein the underframe comprises a water receiving basin, a water outlet and a movable support frame, the water outlet being arranged on the water receiving basin, the movable support frame being connected with the water receiving basin, and the movable support frame being provided with a universal wheel.

3. The intelligent bathing bed according to claim 1, wherein the water outlet array comprises a spray head and an atomizing spray bar, the spray head being arranged on the peripheral surface of the roller, one end of the atomizing spray bar being connected with the spray head, and the other end of the atomizing spray bar being connected with the water outlet pipe.

4. The intelligent bathing bed according to claim 1, further comprising a scrubbing device and a scrubbing support frame, wherein an height of the scrubbing device is provided to be higher than that of the mattress, a bottom of the scrubbing device is provided with scrubbing balls, one end of the scrubbing support frame is connected with a side wall of the underframe, and the other end of the scrubbing support frame is connected with the scrubbing device.

5. The intelligent bathing bed according to claim 1, further comprising a bed shed, wherein the bed shed is connected with the underframe, and the bed shed comprises a bed shed support frame and a waterproof layer, the waterproof layer being connected with the bed shed support frame, and the bed shed support frame being arranged at a top of the underframe.

6. The intelligent bathing bed according to claim 1, further comprising a drying device, wherein the drying device is arranged on the side wall of the underframe and comprises a blower of which a temperature and a wind speed is adjustable.

7. The intelligent bathing bed according to claim 1, further comprising a monitoring device, wherein the monitoring device comprises an infrared sensor and a cardiac electric monitoring armlet.

8. The intelligent bathing bed according to claim 1, further comprising a fixed mattress support and a water inlet device, wherein the fixed mattress support is connected with the underframe and the fixed mattress respectively, and the water inlet device is connected with the water outlet pipe.

9. The intelligent bathing bed according to claim 8, wherein the water inlet device comprises a water pump, a water tank and a water inlet pipe group, the water pump, the water tank and the water inlet pipe group being all arranged on the underframe, the water pump being connected with the water tank through a first solenoid, and the water tank being connected with the water inlet pipe group.

10. The intelligent bathing bed according to claim 7, further comprising a display screen and an image processor, wherein the display screen is connected with the cardiac electric monitoring armlet and the image processor is connected with the infrared sensor.

11. The intelligent bathing bed according to claim 4, wherein there are multiple scrubbing devices, and the multiple scrubbing devices are distributed on both sides of the fixed mattress and the movable mattress.

* * * * *